Dec. 8, 1925.  1,564,243
G. IVORY
BURGLAR TRAP
Filed Nov. 1, 1924   3 Sheets-Sheet 1
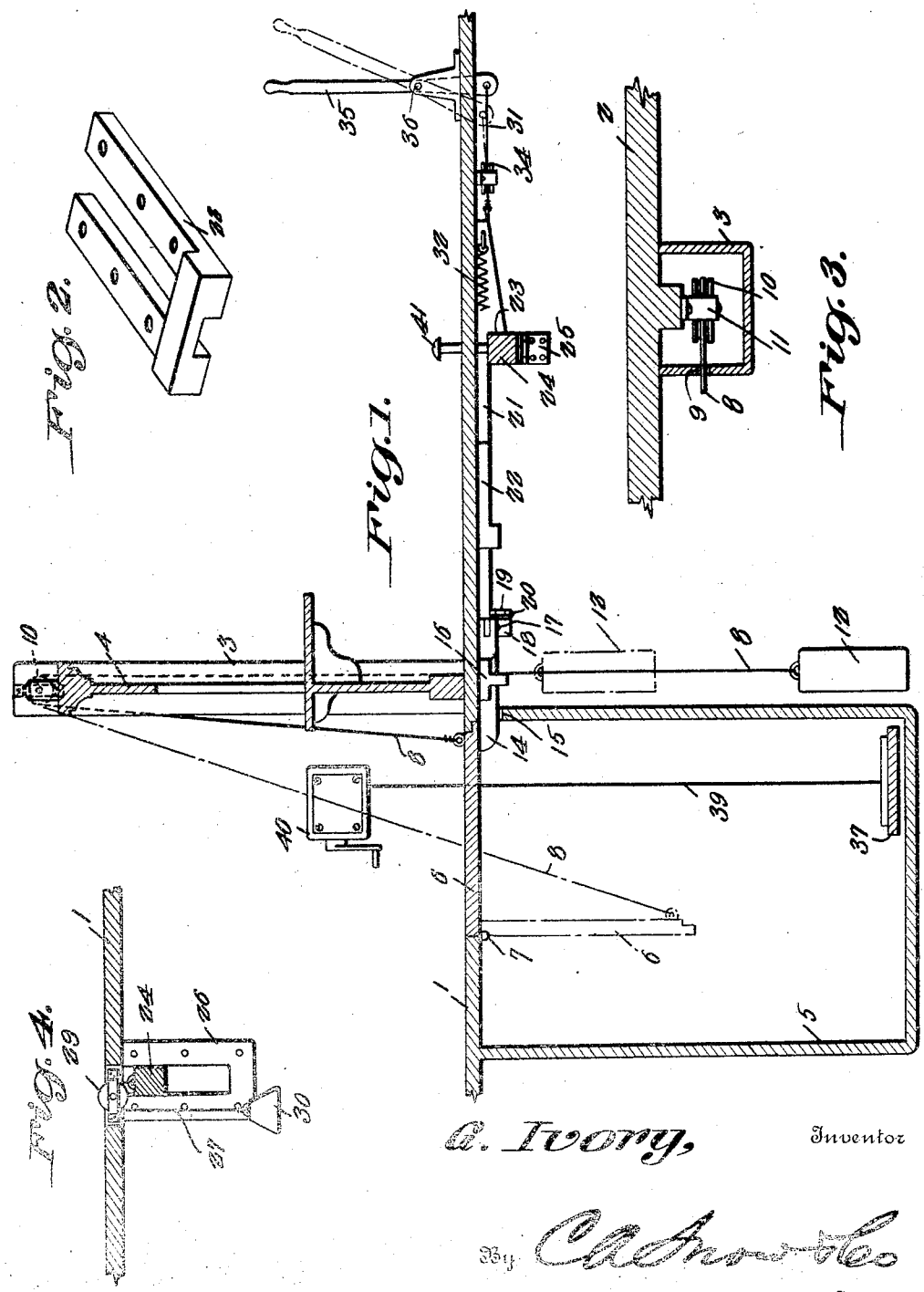
G. Ivory, Inventor

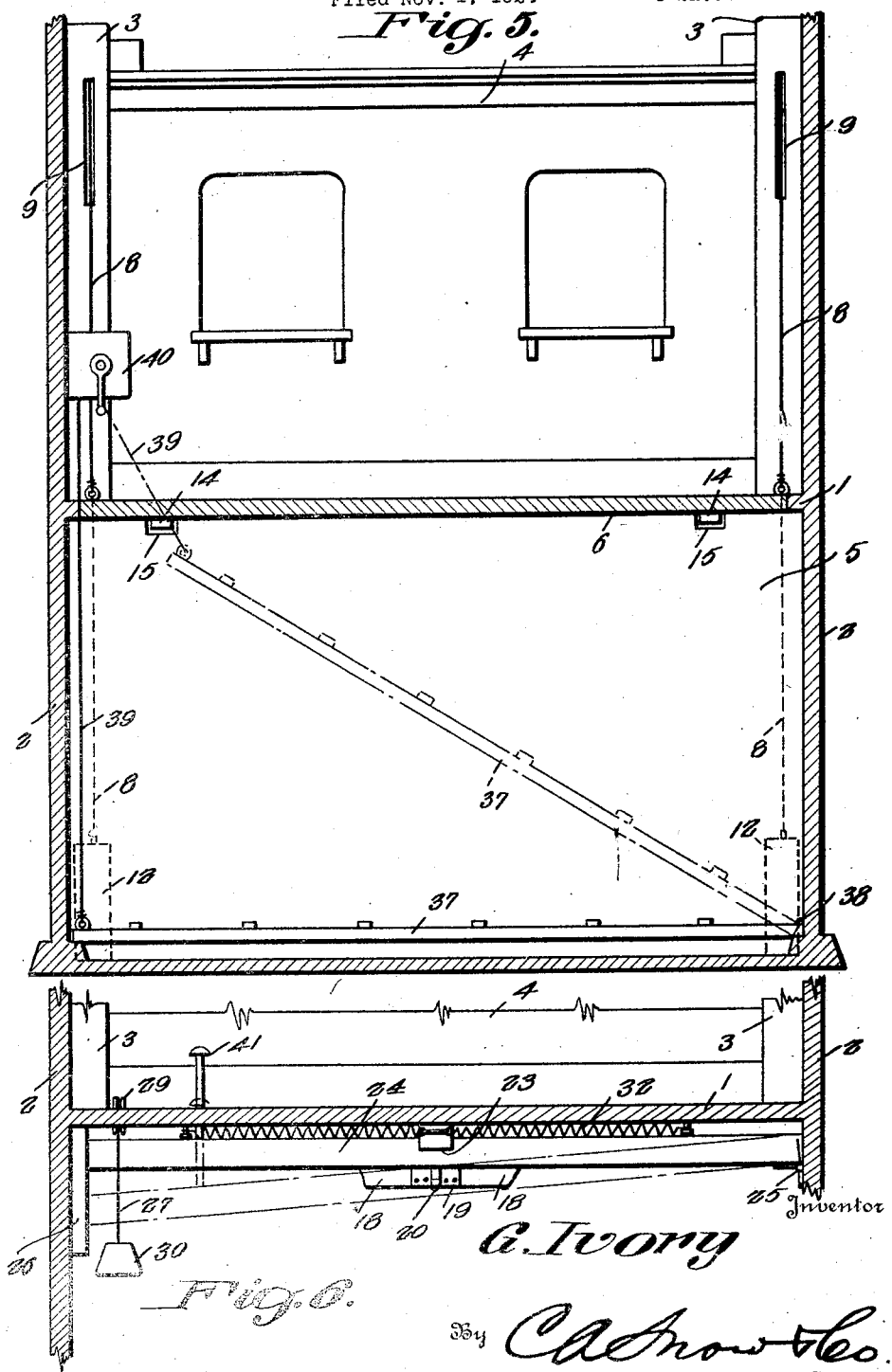

Dec. 8, 1925.                                                                    1,564,243
G. IVORY
BURGLAR TRAP
Filed Nov. 1, 1924                                              3 Sheets-Sheet 3

G. Ivory, Inventor

Patented Dec. 8, 1925.

1,564,243

UNITED STATES PATENT OFFICE.

GUS IVORY, OF JONESBORO, ARKANSAS.

BURGLAR TRAP.

Application filed November 1, 1924. Serial No. 747,390.

*To all whom it may concern:*

Be it known that I, GUS IVORY, a citizen of the United States, residing at Jonesboro, in the county of Craighead and State of Arkansas, have invented a new and useful Burglar Trap, of which the following is a specification.

This invention aims to provide a simple means whereby an official of a bank, or a person legitimately in a building of any kind, may drop into a cell, a burglar or other person threatening the safety and welfare of the bank, as the burglar approaches the cashier's wicket, the vault or other object which is to be protected.

It is within the province of the disclosure to improve generally and to enhance the utility of devices of that type to which the invention appertains.

Although a preferred form of the invention has been disclosed in the drawing, it will be understood that a mechanic, working within the scope of what is claimed, may make changes and alterations without departing from the spirit of the invention.

In the accompanying drawings:—

Figure 1 shows in vertical longitudinal section, a device constructed in accordance with the invention;

Fig. 2 is a perspective view showing one of the guides;

Fig. 3 is a horizontal sectional view disclosing one of the guards and attendant parts;

Fig. 4 is a sectional detail illustrating the mounting for one end of the retainer;

Fig. 5 is a transverse section taken through a building wherein the device forming the subject matter of this application has been mounted;

Fig. 6 is a fragmental cross section showing the latch levers, and attendant parts;

Figure 7:
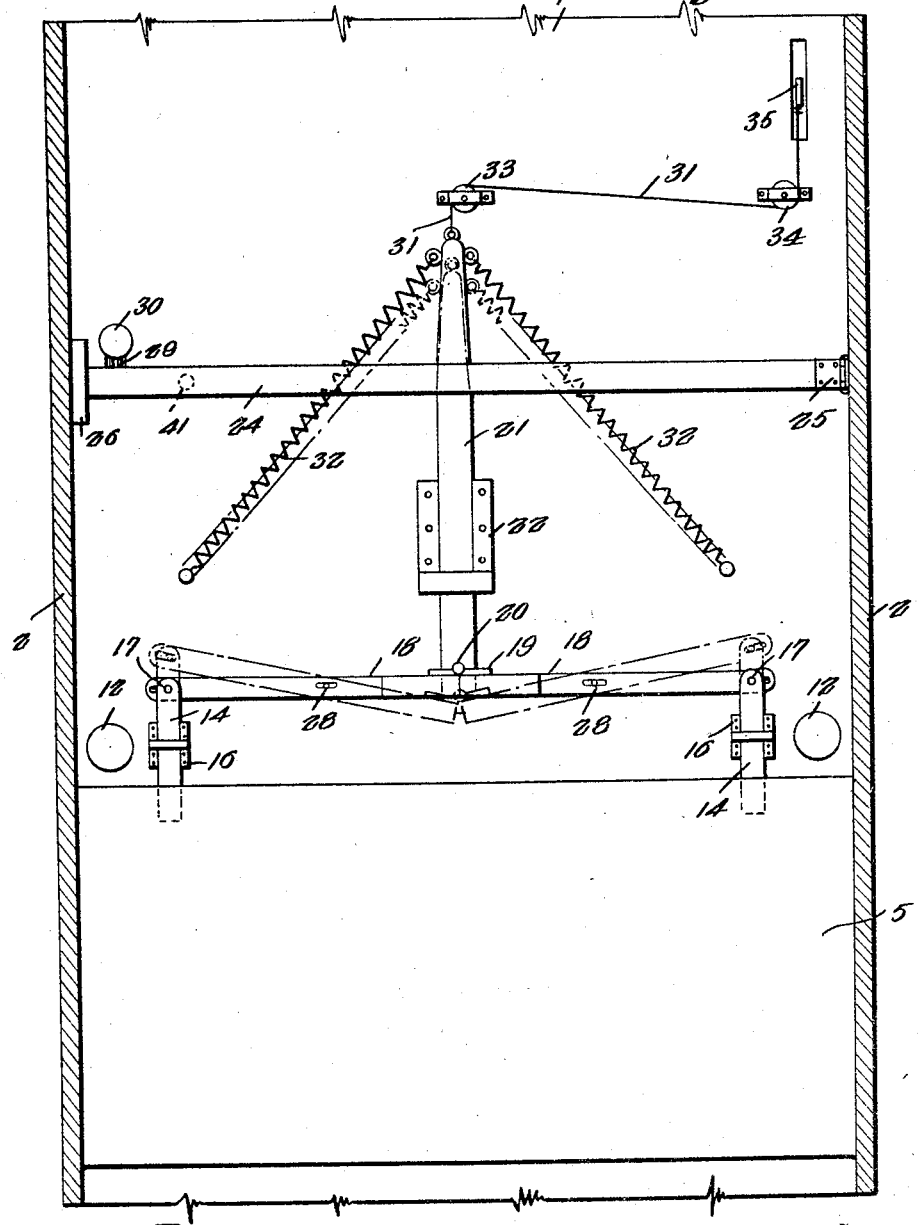
Fig. 7 is a bottom plan of the device as mounted in a building.
Figure 8:
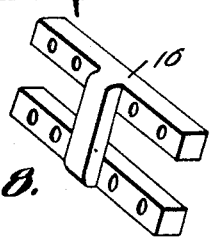
Fig. 8 is a perspective view disclosing another of the guides.

The numeral 1 marks the floor of a bank or of a building, the side walls appearing at 2. Tubular guards 3 extend upwardly from the floor 1 along the side walls 2. The guards 3 are connected by a cashier's wicket 4, assuming that the device is to be used for protecting a wicket, although it is to be understood that the structure hereinafter claimed may be used to protect a vault, or other objects, as well as a cashier's wicket.

A cell 5 is formed below the floor 1 in advance of the wicket 4. A trap door 6 is located in the floor 1, in front of the wicket 4, the forward end of the trap door being hinged at 7 to the floor, and the rear edge of the trap door being free. The lower ends of flexible elements 8 are connected to the trap door 6. The flexible elements 8 extend upwardly through openings 9 in the guards 3 and extend downwardly about sheaves 10 supported at 11 within the guards, the flexible elements 8 being prolonged downwardly below the floor 1, and being provided at their lower ends with weights 12.

Latches 14 extend beneath the rear edge of the trap door 6 and tend to hold the trap door closed, the latches 14 being slidable in openings 15 in the rear wall of the cell 5, and being slidable in guides 16 carried by the floor 1. The rear ends of the latches 14 are loosely mounted at 17 in slots formed in the outer ends of levers 18 fulcrumed intermediate their ends, as at 28, on the floor 1. The inner end of the levers 18 are joined by a hinge 19, and the pin 20 of the hinge forms a pivotal connection between the inner ends of the levers 18 and the forward end of an operating member 21, in the form of a bar, mounted to slide in a guide 22 on the floor 1, the operating member or bar 21 being advanced by diverging retractile springs 32, connected at their rear ends to the member 21 and connected at their forward ends to the floor 1. The operating member 21 is provided adjacent to its rear end with a shoulder 23.

The operating member 21 extends above and across a retainer 24, in the form of a bar, extended transversely of the building, one end of the retainer 24 being hinged at 25 to one of the side walls 2, the shoulder 23 of the operating member 21 being adapted to cooperate with the retainer 24, as shown in Fig. 1 of the drawings. The free end of the retainer 24 is mounted for vertical movement in a guide 26 carried by one of the side walls 2 of the building. A sheave 29 is supported on the floor 1. About the sheave 29 is engaged a flexible element 27, one end of which is connected to the free end of the retainer 24, the other end of the flexible element carrying a weight 30. A flexible element 31 is connected to the rear end of the operating member 21, the flexible element being extended rearwardly and laterally around a pulley 33 on the floor 1, the flexible element being extended rearwardly about a pulley 34 which is also mounted on the floor 1. The rear end of the flexible element 31 is connected to the lower end of a lever 35, fulcrumed at 36 on the floor and extending upwardly above the floor, behind the wicket 4.

A runway 37 is disposed in the cell 5 and extends transversely of the building, one end of the runway 37 being hingedly mounted, as shown at 38. To the free end of the runway 37 is connected a flexible member 39 which may be extended upwardly to a ratchet winch 40 or other suitable instrumentality mounted on one of the side walls 2 of the building. The retainer 24 is provided with a pedal 41 which extends upwardly through the floor 1.

In practical operation when a burglar or other suspicious character approaches the wicket 4 or other object to be guarded, and treads upon the trap door 6, the cashier or other person in charge treads on the pedal 41 and tilts the retainer 24 on its hinged mounting 25, the weight 30 and the flexible element 27 tending normally to keep the retainer 24 engaged with the operating member 21. When the retainer 24 is tilted, as aforesaid, through the instrumentality of the pedal 41, the retainer is disengaged from the shoulder 23 on the operating member 21 and the operating member 21 moves forwardly, under the action of the springs 32. When the operating member 21 moves forwardly, the levers 18 are tilted on their fulcra 28, the latches 14 being disengaged from the trap door 6, whereupon the trap door will swing downwardly, and dump the person standing on the trap door 6 into the cell 5, the weights 12 and the flexible elements 8 serving to close the trap door 6. The burglar or bank robber, thus, is imprisoned in the cell 5, the latches 14 being advanced to hold the trap door 6 in the closed position of Fig. 1, through a train of elements comprising the lever 35, the flexible element 31, the bar 21, and the levers 18.

As soon as the bar 21 has been drawn rearwardly far enough, the retainer 24 being raised by the weight 30, will engage again with the shoulder 23 on the bar 21 and hold the parts in the positions delineated in Fig. 1 of the drawings.

When it is desired to remove the person who has been caught in the cell 5, the door or trap door 6 may be opened, the person in the cell may be covered with a gun, and the winch 40 may be operated to raise the free end of the runway 37, whereupon the person in the cell 5 may be compelled to ascend the runway.

It is again pointed out that, although the device has been shown as a means for protecting a cashier's wicket 4, the structure is equally useful in protecting a vault or anything else of a like sort.

Having thus described the invention, what is claimed is:—

1. In a device of the class described, a floor, a trap door hinged to the floor, spaced slidably supported latches engaged with one edge of the trap door to hold it closed, levers fulcrumed intermediate their ends, the latches being connected with the outer ends of the levers, a slidably mounted operating member connected to the inner ends of the levers, yieldable means for actuating the operating member to disengage the latches from the trap door, mechanism for actuating the operating member from a remote point, a retainer engaged with the operating member, and means for operating the retainer from a remote point.

2. A device of the class described, constructed as set forth in claim 1, and further characterized by the fact that the retainer is mounted to swing transversely of the operating member, yieldable means being provided for holding the retainer engaged with the operating member.

In testimony that I claim the foregoing as my own, I have hereto affixed my signature.

GUS IVORY.